United States Patent
Smith

(10) Patent No.: US 11,751,556 B2
(45) Date of Patent: Sep. 12, 2023

(54) SYSTEM AND METHOD FOR ACTUATING A BOOM ASSEMBLY OF AN AGRICULTURAL SPRAYER

(71) Applicant: CNH Industrial America LLC, New Holland, PA (US)

(72) Inventor: Kevin M. Smith, Narvon, PA (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 0 days.

(21) Appl. No.: 17/706,160

(22) Filed: Mar. 28, 2022

(65) Prior Publication Data
US 2022/0211023 A1 Jul. 7, 2022

Related U.S. Application Data

(62) Division of application No. 16/288,415, filed on Feb. 28, 2019, now Pat. No. 11,284,611.

(51) Int. Cl.
*A01M 7/00* (2006.01)

(52) U.S. Cl.
CPC .......... *A01M 7/0057* (2013.01); *A01M 7/006* (2013.01); *A01M 7/0075* (2013.01); *A01M 7/0089* (2013.01)

(58) Field of Classification Search
CPC .. A01M 7/0053; A01M 7/0057; A01M 7/006; A01M 7/0071; A01M 7/0075; A01M 7/0082; A01M 7/0089; B05B 1/20; A01C 23/047
See application file for complete search history.

(56) References Cited

U.S. PATENT DOCUMENTS

| | | | |
|---|---|---|---|
| 3,107,055 A | 10/1963 | Palmer | |
| 4,372,492 A | 2/1983 | Blumenshine | |
| 4,565,321 A | 1/1986 | Vestergaard et al. | |
| 4,946,102 A | 8/1990 | Dewitt et al. | |
| 4,986,721 A | 1/1991 | Lowder et al. | |
| 6,343,661 B1 | 2/2002 | Thompson et al. | |
| 6,834,223 B2* | 12/2004 | Strelioff | A01M 7/0057 701/50 |
| 7,631,817 B2 | 12/2009 | Thompson et al. | |
| 7,740,189 B2 | 6/2010 | Meyer et al. | |

(Continued)

FOREIGN PATENT DOCUMENTS

| | | |
|---|---|---|
| DE | 10148422 | 4/2003 |
| EP | 0504527 | 9/1992 |

*Primary Examiner* — Darren W Gorman
(74) *Attorney, Agent, or Firm* — Rebecca Henkel; Rickard Demille

(57) ABSTRACT

A system for actuating a boom assembly of an agricultural sprayer, the system having a frame, a boom assembly supported relative to the frame, and a linkage assembly configured to couple the boom assembly to the frame. The linkage assembly includes a support arm pivotably coupled between the frame and the boom assembly, a lift actuator pivotably coupled between the frame and the support arm and configured to raise and lower the boom assembly in a vertical direction, and a nit actuator pivotably coupled between the frame and the boom assembly and configured to adjust a tilt angle of the boom assembly relative to the vertical direction. The system further includes a controller configured to selectively actuate the tilt actuator to adjust the tilt angle of the boom assembly to an operational tilt angle.

15 Claims, 8 Drawing Sheets

(56) References Cited

U.S. PATENT DOCUMENTS

| | | |
|---|---|---|
| 8,464,967 B2 | 6/2013 | Kuphal et al. |
| 8,688,331 B2 * | 4/2014 | Peterson .............. A01B 79/005 |
| | | 172/383 |
| 8,827,180 B2 | 9/2014 | Honermann et al. |
| 9,504,211 B2 | 11/2016 | Venton-Walters |
| 2014/0074360 A1 | 3/2014 | Rosa et al. |
| 2014/0196996 A1 | 7/2014 | Ito |
| 2016/0038961 A1 | 2/2016 | Carlson |
| 2017/0027103 A1 | 2/2017 | Grotelueschen |
| 2017/0027152 A1* | 2/2017 | Hiddema ............ A01M 7/0075 |
| 2019/0104720 A1 | 4/2019 | Sullivan |
| 2019/0105667 A1* | 4/2019 | Bharatiya ............ A01M 7/0057 |
| 2019/0174737 A1* | 6/2019 | Schwalbe ............ A01M 7/0014 |
| 2020/0029484 A1* | 1/2020 | Weidenbach .......... A01B 63/24 |

* cited by examiner

SYSTEM AND METHOD FOR ACTUATING A BOOM ASSEMBLY OF AN AGRICULTURAL SPRAYER

CROSS-REFERENCE TO RELATED APPLICATIONS

The present application is a divisional of U.S. patent application Ser. No. 16/288,415, filed on Feb. 28, 2019, the disclosure of which is hereby incorporated by reference herein in its entirety for all purposes.

FIELD OF THE INVENTION

The present subject matter relates generally to agricultural sprayers, and more particularly, to systems and methods for actuating a boom assembly of an agricultural sprayer to adjust an orientation of one or more boom sections of the boom assembly relative to a ground surface over which the boom assembly is being traversed.

BACKGROUND OF THE INVENTION

Agricultural sprayers apply an agricultural substance (e.g., a pesticide, a fungicide, and/or the like) onto crops and/or a ground surface as the sprayer is traveling across a field. To facilitate such travel, sprayers are configured as self-propelled vehicles or implements towed behind an agricultural tractor or other suitable work vehicle. A typical sprayer includes an outwardly-extending boom assembly having a plurality of boom sections supporting a plurality of spaced apart nozzles. Each nozzle is configured to dispense or otherwise spray the agricultural substance onto underlying crops and/or weeds. Typically, the nozzles are fixed to the boom assembly such that a spray angle of the nozzles relative to the underlying crops and/or weeds is constant. The boom assembly is disposed in a "floating" arrangement during the spraying operation, wherein hydraulic actuators extend the boom sections to cover wide swaths of the field. For transport, the boom assembly is folded by the hydraulic actuators to reduce the width of the sprayer. Typically, the hydraulic actuators fold the boom assembly horizontally to keep the folding height as low as possible for transport clearance.

It is generally desirable that the various boom sections of a boom assembly of a sprayer remain at a desired vertical distance or height above a given field reference position, such as the ground surface or a crop canopy, while in the floating arrangement to facilitate uniform distribution of the dispensed agricultural substance across the field. Currently, to facilitate adjustments of the vertical height of the boom assembly, a central boom section of the boom assembly is mounted to the adjacent frame or chassis of the sprayer via a linkage assembly having one or more lifting actuators configured to raise and lower the entire boom assembly vertically relative to the ground surface. However, as the width of the boom assembly is increased to cover wider swaths of field, it is more difficult to keep the boom assembly at the desired vertical distance across its entire width, particularly when trying to account for localized variations in the ground contour or canopy height across the width of the boom assembly, and to provide proper spray coverage with the fixed spray nozzles.

Accordingly, an improved system and related method for actuating a boom assembly of an agricultural sprayer to allow for adjustments in the orientation of one or more boom sections of the boom assembly relative to a field reference position would be welcomed in the technology.

BRIEF DESCRIPTION OF THE INVENTION

Aspects and advantages of the invention will be set forth in part in the following description, or may be obvious from the description, or may be learned through practice of the invention.

In one embodiment, the present subject matter is directed to a system for actuating a boom assembly of an agricultural sprayer, the system including a frame, a boom assembly supported relative to the frame, a linkage assembly configured to couple the boom assembly to the frame, and a controller. The linkage assembly includes a support arm, a lift actuator, and a tilt actuator. The support arm is pivotably coupled between the frame and the boom assembly. The lift actuator is pivotably coupled between the frame and the support arm and is configured to raise and lower the boom assembly in a vertical direction. The tilt actuator is pivotably coupled between the frame and the boom assembly and is configured to adjust a tilt angle of the boom assembly relative to the vertical direction. The controller is configured to selectively actuate the tilt actuator to adjust the tilt angle of the boom assembly to an operational tilt angle.

In another embodiment, the present subject matter is directed to a method for actuating a boom assembly of an agricultural sprayer. The boom assembly is configured to be coupled to a frame of the agricultural sprayer via a linkage assembly. The linkage assembly includes a tilt actuator configured to adjust a tilt angle of the boom assembly relative to the vertical direction. The method includes controlling, with a computing device, the operation of the tilt actuator to adjust an orientation of the boom assembly relative to the vertical direction to a substantially non-vertical orientation. The method further includes receiving, with the computing device, an input indicative of a change in a vertical position of one or more sections of the boom assembly relative to a field reference position. Additionally, the method includes actuating, with the computing device, the one or more sections of the boom assembly to adjust the vertical position of the one or more sections of the boom assembly relative to the field reference position based on the received input.

In a further embodiment, the present subject matter is directed to another method for actuating a boom assembly of an agricultural sprayer. The boom assembly is coupled to a frame of the agricultural sprayer via a linkage assembly, the linkage assembly having a tilt actuator configured to adjust a tilt angle of the boom assembly relative to the vertical direction. The method includes controlling, with a computing device, an operation of fold actuators of the boom assembly to perform a folding operation during which the boom assembly is moved from one of a working position or a transport position to the other of the working position or the transport position. Additionally, the method includes controlling, with the computing device, an operation of the tilt actuator to adjust the tilt angle of the boom assembly to vary a vertical height of the boom assembly during the performance of the folding operation or after the boom assembly has reached the other of the working position or the transport position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
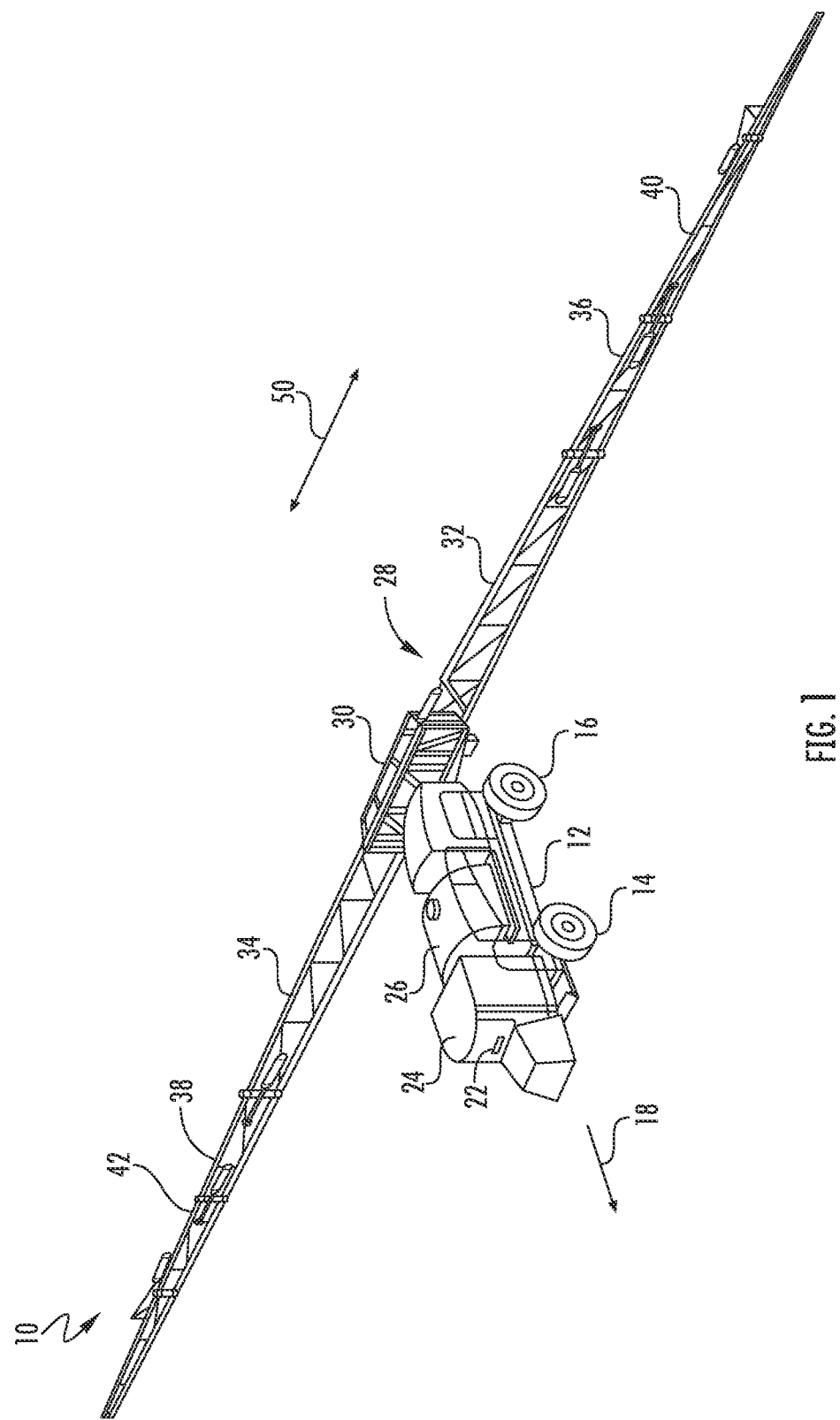
FIG. 1 illustrates a perspective view of one embodiment of an agricultural sprayer in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for actuating a boom assembly of an agricultural sprayer. Specifically, in several embodiments, the disclosed system may allow for a boom assembly to be tilted (e.g., about a horizontal axis) to adjust the orientation of the boom assembly from a substantially vertical orientation (e.g., at which the boom assembly defines a substantially zero tilt angle relative to a vertical reference plane) to a non-vertical orientation (e.g., at which the boom assembly defines a substantially non-zero tilt angle relative to the vertical reference plane). By allowing the boom assembly to be actuated or tilted in a manner that adjusts the vertical orientation of the boom assembly relative to the ground surface over which the boom assembly is being traversed, individual actuators of the boom assembly may be used to independently adjust the vertical positioning of one or more boom sections of the assembly relative to a given field reference position (e.g., such as the ground surface or a crop canopy) to account for localized variations in the ground contour or canopy height and/or to allow the spray angle of the spray nozzles to be adjusted to improve spray coverage of the field.

In several embodiments, the disclosed system may include a boom assembly having a plurality of boom sections, such as a central boom section and one or more auxiliary boom sections coupled to each side of the central boom section. For instance, in one embodiment, the boom assembly may include first and second inner boom sections pivotably coupled to the opposed sides of the central boom section, first and second middle boom sections pivotably coupled to the first and second inner boom sections, respectively, and first and second outer boom sections pivotably coupled to the first and second middle boom sections, respectively. A plurality of spray nozzles may be mounted to one or more of the boom sections. In addition, an actuator (e.g. fold cylinder) may be coupled between each pair of adjacent boom sections to allow the outboard boom section of each pair to be pivoted or folded relative to the adjacent inboard boom section of each pair. In general, the fold actuators may be used to fold the boom sections relative to one another along a lateral direction of the boom assembly to reduce the width of the boom assembly for transport. However, in accordance with aspects of the present subject matter, the fold actuators may also be utilized in operative association with the disclosed system to adjust the orientation of the boom sections relative to the surface across which the agricultural sprayer is moving to obtain a more uniform vertical distance between the boom assembly and an associated field reference position (e.g., the ground surface or crop canopy) across the entire width of the boom assembly during the performance of an agricultural spraying operation.

To allow for such adjustments in the vertical distance between the boom assembly and the field reference position, the disclosed system may, in several embodiments, include both one or more lift actuators (e.g., a lift cylinder(s)) and one or more separate tilt actuators (e.g., a tilt cylinder(s)). For example, the lift and tilt actuators may each be pivotably coupled between the boom assembly and an adjacent frame or chassis of the agricultural sprayer. In such an embodiment, when it is desired to adjust the vertical distance between the entire boom assembly and the ground surface, the operation of the lift actuator may be controlled to raise or lower the entire boom assembly relative to the ground surface. Additionally, the operation of the tilt actuator may be controlled to adjust the tilt angle of the entire boom assembly relative to the vertical direction (e.g., relative to a vertical reference plane), which also adjusts a spray angle of the nozzles relative to the field reference position. In doing so, when it is desired to adjust the orientation of one or more boom sections of the boom assembly relative to the field reference position, the fold actuators associated with such boom section(s) may be actuated to adjust the vertical distance between the boom section(s) and the field reference position. Specifically, by adjusting the orientation of the boom assembly from a vertical orientation to a tilted or non-vertical orientation, retraction/extension of each fold actuator results in actuation of the associated boom section relative to its adjacent boom section along a travel path that has a vertical component, thereby allowing the vertical positioning of such boom section to be adjusted.

In particular embodiments of the present subject matter, a controller of the disclosed system may be configured to control the operation of the fold and lift actuators in order to adjust the orientation of one or more of the boom sections of the boom assembly relative to the ground surface. In some embodiments, the controller may be configured to control the operation of the actuators based on an input received from an operator, such as an input requesting that the orientation of one or more of the boom sections and/the or spray angle of the associated spray nozzles be adjusted to maintain the positioning of such boom section(s) relative to the field reference position. Additionally, or alternatively, in some embodiments, one or more sensors may be installed on and/or relative to the boom assembly to measure the distance between one or more of the boom sections of the boom assembly and the field reference position. In such embodiments, the controller may be configured to monitor the measurements provided by the one or more sensors and control the operation of the actuators based on the feedback from the sensors in order to automatically adjust the orientation of the entire boom assembly and/or one or more individual boom sections of the boom assembly to the desired orientation(s).

Figure 2:
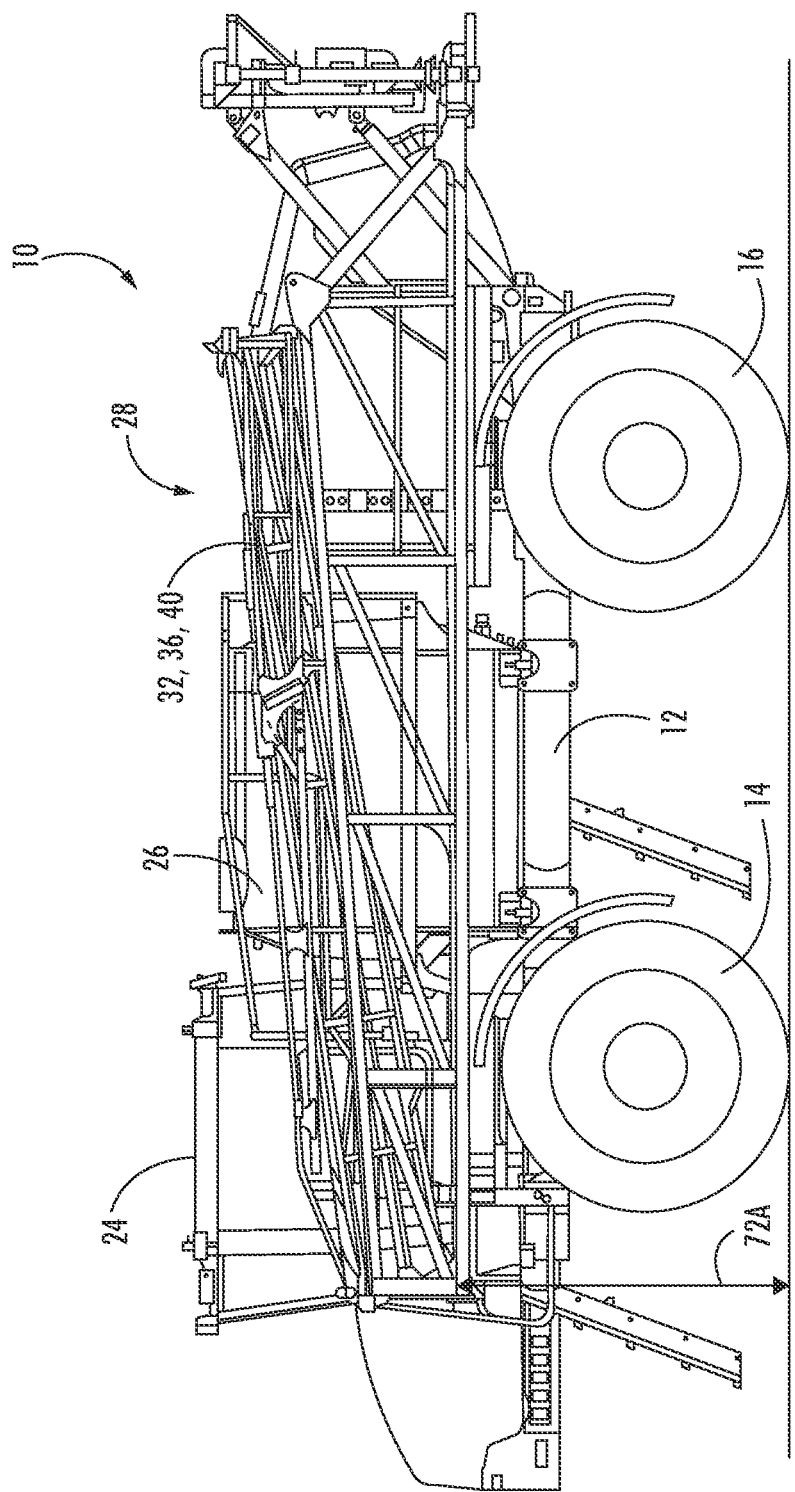
FIG. 2 illustrates a side view of an sprayer in accordance with aspects of the present subject matter; particularly illustrating a transport position of the sprayer.

Referring now to FIGS. 1 and 2, differing views of one embodiment of an agricultural sprayer 10 is illustrated in accordance with aspects of the present subject matter. Specifically, FIG. 1 illustrates a perspective view of the sprayer 10 with its boom assembly in a working or unfolded position and FIG. 2 illustrates a side view of the sprayer with its boom assembly in a transport or folded position. In the illustrated embodiment, the agricultural sprayer 10 is configured as a self-propelled agricultural sprayer. However, in alternative embodiments, the agricultural sprayer 10 may be configured as any other suitable type of agricultural sprayer 10 configured to perform agricultural spraying operations, such as a tractor or other vehicle configured to haul a spraying implement.

As shown in FIG. 1, the agricultural sprayer 10 may include a chassis or frame 12 configured to support or couple to a plurality of components. For example, a pair of steerable front wheels 14 (one is shown) and a pair of driven rear wheels 16 (one is shown) may be coupled to the frame 12. The wheels 14, 16 may be configured to support the agricultural sprayer 10 relative to the ground and move the agricultural sprayer 10 in a direction of travel (e.g., as indicated by arrow 18 in FIG. 1) across a field. In this regard, the agricultural sprayer 10 may include an engine (not shown) and a transmission (not shown) configured to transmit power from the engine to the wheels 14, 16. However, it should be appreciated that, in further embodiments, the front wheels 14 of the agricultural sprayer 10 may be driven in addition to or in lieu of the rear wheels 16. The frame 12 may also support an operator's cab 24 that houses various control or input devices (e.g., levers, pedals, control panels, buttons, and/or the like) for permitting an operator to control the operation of the work vehicle 10. For instance, as shown in FIG. 1, the agricultural sprayer 10 may include a control panel 22 for displaying message windows and/or alerts to the operator and/or for allowing the operator to interface with the vehicle's controller. In one embodiment, the control panel 22 may include buttons, knobs and/or any other suitable input devices that allow the operator to provide user inputs to the controller.

Furthermore, the frame 12 may also support a tank 26 and a frame or boom assembly 28 mounted on the frame 12. The tank 26 is generally configured to store or hold an agricultural substance, such as a pesticide, a fungicide, a rodenticide, a fertilizer, a nutrient, and/or the like. As is generally understood, a plurality of nozzles 62 (FIGS. 3-4) mounted on the boom assembly 28 may be configured to dispense the agricultural substance stored in the tank 26 onto the underlying plants and/or soil.

As shown in FIGS. 1 and 2, the boom assembly 28 of the agricultural sprayer 10 may generally be movable between a working or unfolded position (FIG. 1) and a transport or folded position (FIG. 2). In the working position, various sections of the boom assembly 28 are fully extended such that the boom assembly 28 extends over as wide a swath of a field as possible. In the transport position, the various sections of the boom assembly 28 are fully retracted to reduce the width of the sprayer 10 for travel. As will be described below, the boom assembly 28 may include a plurality of fold actuators coupled between adjacent boom sections of the boom assembly 28 for moving the boom assembly 28 between the working and transport positions.

Figure 3:
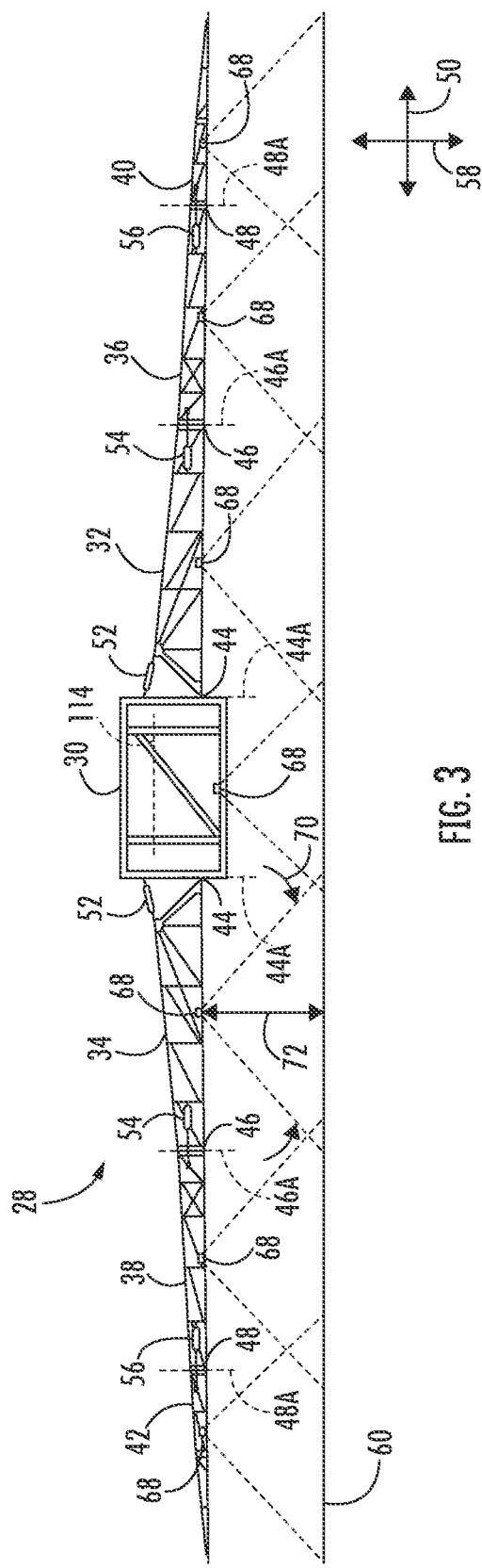
FIG. 3 illustrates a front view of a boom assembly of an agricultural sprayer in accordance with aspects of the present subject matter.

Referring now to FIG. 3, a front view of one embodiment of the boom assembly 28 of the agricultural sprayer 10 is illustrated in accordance with aspects of the present subject matter. As shown, in one embodiment, the boom assembly 28 includes a central boom section 30, inner right and left boom sections 32, 34 pivotably coupled to the central boom section 30, right and left middle boom sections 36, 38 pivotably coupled to the respective right and left inner boom sections 32, 34, and right and left outer boom sections 40, 42 pivotably coupled to the respective right and left middle boom sections 36, 38. For example, each of the inner boom sections 32, 34 is pivotably coupled to the central boom section 30 at pivot joints 44. Similarly, the middle boom sections 36, 38 are pivotally coupled to the respective inner boom sections 32, 34 at pivot joints 46 while the outer boom sections 40, 42 are pivotably coupled to the respective middle boom sections 36, 38 at pivot joints 48. As is generally understood, pivot joints 44, 46, 48 may be configured to allow relative pivotal motion between adjacent boom sections of the boom assembly 28. For example, the pivot joints 44, 46, 48 may allow for articulation of the various boom sections between a fully extended or working position (e.g., as shown in FIG. 3), in which the boom sections are unfolded along a lateral direction 50 of the boom assembly 28 to allow for the performance of an agricultural spraying operation, and a transport position (FIG. 2), in which the boom sections are folded inwardly to reduce the overall width of the boom assembly 28 along the lateral direction 50. It should be appreciated that, although the boom assembly 28 is shown in FIG. 3 as including a central boom section and three individual boom sections coupled to each side of the central boom sections, the boom assembly 28 may generally have any suitable number of boom sections.

Additionally, as shown in FIG. 1, the boom assembly 28 may include inner fold actuators 52 coupled between the inner boom sections 32, 34 and the central boom section 30 to enable pivoting or folding between the fully-extended and transport positions. For example, by retracting/extending the inner fold actuators 52, the inner boom sections 32, 34 may be pivoted or folded relative to the central boom section 30 about a pivot axis 44A defined by the pivot joints 44. Moreover, the boom assembly 28 may also include middle fold actuators 54 coupled between each inner boom section 32, 34 and its adjacent middle boom section 36, 38 and outer fold actuators 56 coupled between each middle boom section 36, 38 and its adjacent outer boom section 40, 42. As such, by retracting/extending the middle and outer fold actuators 54, 56, each middle and outer boom section 36, 38, 40, 42 may be pivoted or folded relative to its respective inwardly adjacent boom section 32, 34, 36, 38 about a respective pivot axis 46A, 48A. When moving to the transport position, the boom assembly 28 and fold actuators 52, 54, 56 are typically oriented such that the pivot axes 44A, 46A, 48A are parallel to the vertical direction 58 and, thus, the various boom sections 32, 34, 36, 38, 40, 42 of the boom assembly 28 are configured to be folded horizontally (e.g., parallel to the lateral direction 50) about the pivot axes 44A, 46A, 48A to keep the folding height of the boom assembly 28 as low as possible for transport.

Moreover, as shown in FIG. 3, the boom assembly 28 may be positioned above or otherwise be spaced apart from a field reference position, such as a ground surface (as shown by line 60) of a field along the vertical direction 58, it should be appreciated that, in other embodiments, the field reference position may correspond to any other suitable reference position within the field, such as the crop canopy or any other portion of the field that may serve as a reference with respect to which the boom assembly 28 is oriented. As will be described below, the position and/or orientation of the entire boom assembly 28 may be adjusted relative to the ground surface 60. For example, the boom assembly 28 may be moved up and/or down to adjust the distance between the boom assembly 28 and the ground surface 60 along the vertical direction 58. Additionally, as will be described below, the vertical positioning of the various individual boom sections of the boom assembly 28 may also be adjusted relative to the ground surface 60. For example, in accordance with aspects of the present subject matter, a tilt angle of the boom assembly 28 may be adjusted relative to the vertical direction 58 such that the fold actuators 52, 54, 56 may be used to individually adjust the vertical position and/or orientation of each respective boom section 32, 34, 36, 38, 40, 42, e.g., during operation of the agricultural sprayer 10. Further, as will be described below, a spray angle of the spray nozzles 62 may be adjusted relative to the ground surface 60 to improve spray coverage. For example, in accordance with aspects of the present subject matter, the tilt angle of the boom assembly 28 may be adjusted relative to the vertical direction 58 such that the spray angle of the spray nozzles 62 is correspondingly adjusted. Moreover, as will be described below, a vertical height of the boom assembly 28 may be adjusted, e.g., after the boom assembly 28 has been moved into one of its transport or working positions or while the boom assembly 28 is being moved into its transport or working position. For example, in accordance with aspects of the present subject matter, the tilt angle of the boom assembly 28 may be adjusted relative to the vertical direction 58 such that the vertical height of the boom assembly 28 may be increased or decreased to improve the ground clearance or reduce the vertical profile of the agricultural sprayer 10, e.g., for transport.

Further, in several embodiments, the agricultural sprayer 10 may include one or more sensors 68 configured to capture data indicative of an orientation or position of the boom assembly 28 relative to the ground surface 60. In several embodiments, the sensor(s) 68 may be installed or otherwise positioned on the boom assembly 28. For example, as shown in FIG. 3, a sensor 68 may be positioned on each boom section 30, 32, 34, 36, 38, 40, 42 of the boom assembly 28. As such, each sensor 68 may have a field of view (e.g., as indicated by dashed lines 70 in FIG. 3) directed toward a location underneath and/or in front of the boom assembly 28 relative to the direction of travel 18. In this regard, each sensor 68 may be able to capture data indicative of the profile or contour of the ground surface 60 within its field of view 70. In one embodiment, the captured data may be indicative of a distance between the associated sensor 68 and the ground surface 60 (e.g., as indicated by arrow 72 in FIG. 3), with such distance(s) generally being associated with the distance between the respective boom section and the ground surface 60. However, in alternative embodiments, the sensor(s) 68 may be positioned at any other suitable location(s) on and/or coupled to any other suitable component(s) of the agricultural sprayer 10. Furthermore, it should be appreciated that the agricultural sprayer 10 may include any suitable number of sensors 68 and should not be construed as being limited to the number of sensors 68 shown in FIG. 3.

It should be appreciated that the sensor(s) 68 may generally correspond to any suitable sensing device(s). In several embodiments, the sensor(s) 68 may be configured to emit one or more output signals for reflection off of the ground surface 60 and receive or sense the return signal(s). For example, in one embodiment, each sensor 68 may correspond to a radio detection and ranging (RADAR) sensor configured to emit one or more radio signals for reflection off of the ground surface 60. However, in alternative embodiments, the sensor(s) 68 may correspond to an ultrasonic sensor(s) or any other suitable type of sensor(s).

Figure 4:
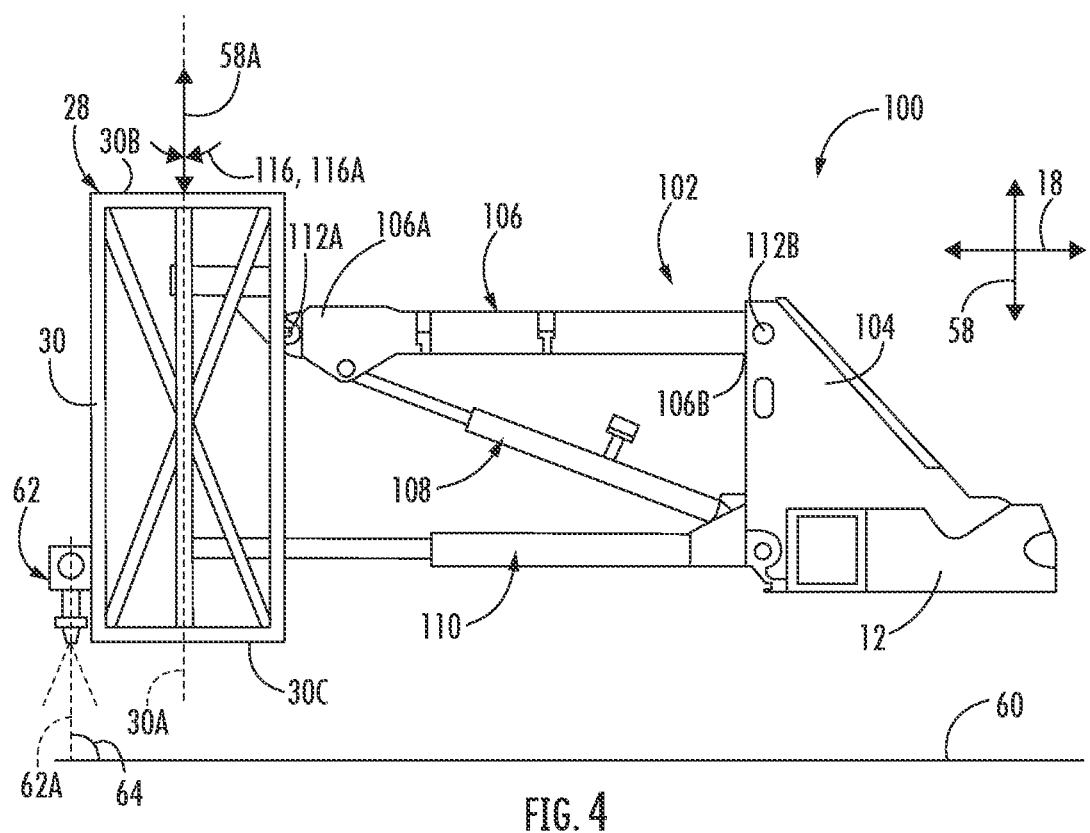
FIG. 4 illustrates a side view of one embodiment of a system for actuating a boom assembly of an agricultural sprayer, particularly illustrating the boom assembly at a vertical or folding tilt angle in accordance with aspects of the present subject matter.
Figure 5:
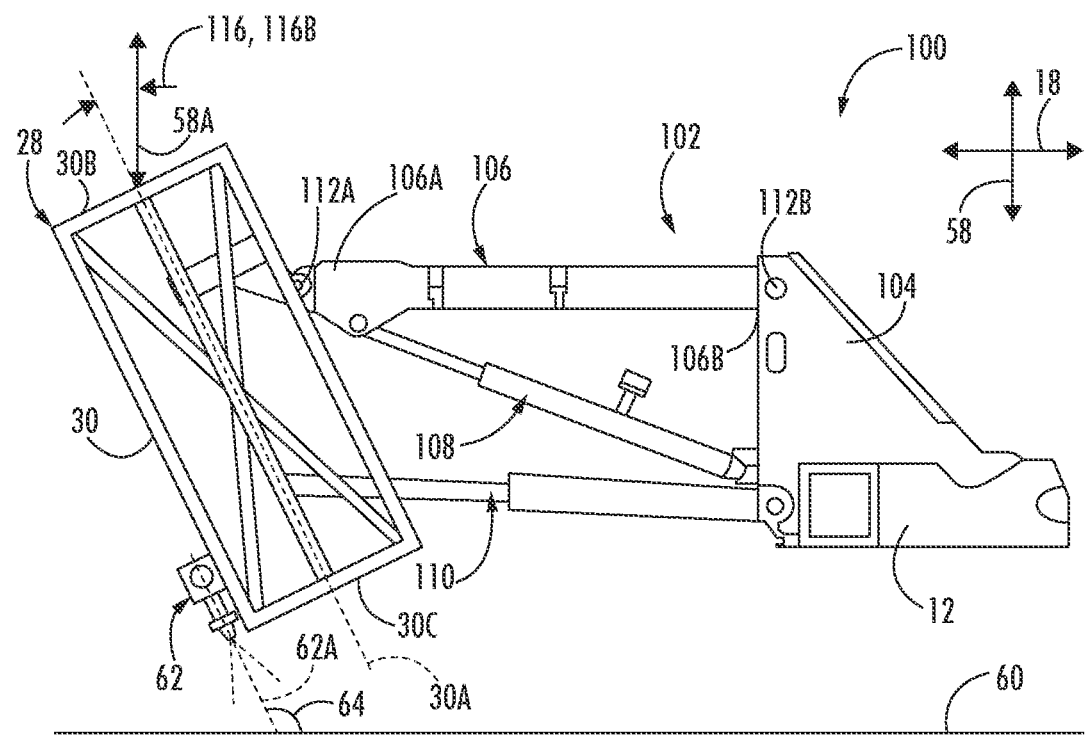
FIG. 5 illustrates another side view of the system shown in FIG. 4, particularly illustrating the boom assembly at a non-vertical or operational tilt angle in accordance with aspects of the present subject matter.
Figure 6:
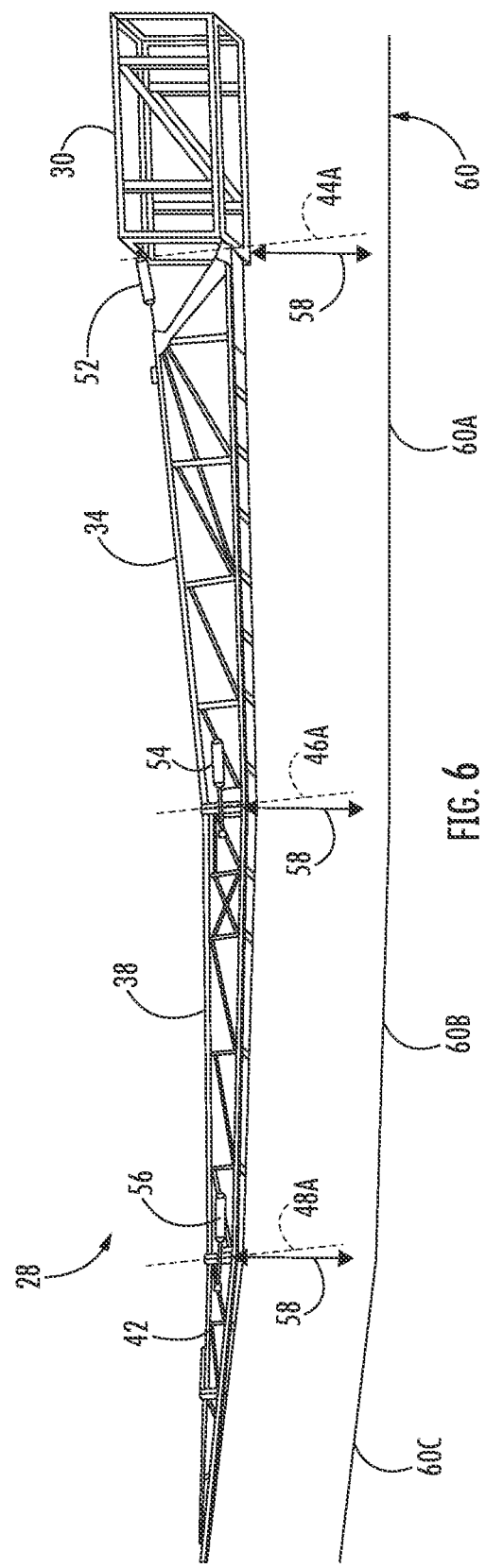
FIG. 6 illustrates a partial, front view of the boom assembly shown in FIG. 5, particularly illustrating the boom assembly after the orientation of one or more boom sections of the assembly has been adjusted relative to the ground surface to account for variations in the contour of the ground surface across the width of the boom assembly in accordance with aspects of the present subject matter.

Referring now to FIGS. 3-5, one embodiment of a system 100 for actuating a boom assembly is illustrated in accordance with aspects of the present subject matter. Specifically, FIGS. 3 and 4 illustrate side views of various components of the system 100, particularly illustrating the boom assembly 28 of the system 100 at both a substantially vertical orientation (FIG. 4) and a substantially non-vertical orientation (FIG. 5), Additionally, FIG. 6 illustrates a perspective view of a portion of the boom assembly 28 described herein, particularly illustrating an example embodiment of a manner in which boom sections of the boom assembly 28 can be actuated in accordance with aspects of the present subject matter to account for a varying ground contour. In general, the system 100 will be described herein with reference to the agricultural sprayer 10 and related boom assembly 28 described above with reference to FIGS. 1 and 2. However, it should be appreciated by those of ordinary skill in the art that the disclosed system 100 may generally be used with agricultural sprayers having any other suitable sprayer configuration and/or boom assemblies having any other suitable boom configuration.

As shown in FIGS. 3 and 4, the system 100 may include a linkage assembly 102 configured to couple the boom assembly 28 to the frame 12 of the agricultural sprayer 10, e.g., via a mount 104 rigidly coupled to the frame 12. In several embodiments, the linkage assembly 102 includes one or more support arms 106, one or more lift actuators 108, and one or more tilt actuators 110. As will be described below, the support arm(s) 106, lift actuator(s) 108, and tilt actuator(s) 110 may be coupled between the boom assembly 28 and the frame 12 to allow the position and/or orientation of the boom assembly 28 to be adjusted relative to the around surface 60 (FIG. 3). In the illustrated embodiment, the support arm 106 is generally shown as being an upper link of the linkage assembly 102 and the tilt actuator 110 is shown as being a lower link of the linkage assembly 102. However, it should be appreciated by one skilled in the art that the support arm 106 and tilt actuator 110 may instead be arranged in any other suitable configuration that allows the disclosed system 10 to function as described herein.

In the illustrated embodiment, each support arm 106 is pivotably coupled between the mount 104 and the central frame section 30 of the boom assembly 28. More particularly, each support arm 106 has a fixed length defined between a first end 106A of the support arm 106 and a second end 106B of the support arm 106. The first end 106A of the support arm 106 is pivotably coupled to the mount 104, e.g., via a first pivot joint 112A, and the second end 106B of the support arm 106 is pivotably coupled to the central frame section 30 of the boom assembly 28, e.g., via a second pivot joint 112B. The support arm(s) 106, together with the lift actuator(s) 108, may be configured to support the weight of the boom assembly 28 relative to the frame 12.

As shown in FIGS. 3 and 4, the lift actuator 108 is pivotably coupled between a support arm 106 and the mount 104. The lift actuator(s) may be configured to have a selectively variable length. For example, in one embodiment, the lift actuator(s) 108 may be configured as a fluid-driven actuator(s), such a hydraulic or pneumatic cylinder(s). However, in alternative embodiments, the lift actuator(s) 108 may be configured as any other suitable type of actuator(s), such as electric linear actuator(s). As such, the lift actuator(s) 108 may be configured to extend or retract to pivot the respective support arm(s) 106 about the second pivot joint 112B such that the boom assembly 28 as a whole is raised or lowered along the vertical direction 58 relative to the chassis 12. Thus, the distance between the boom assembly 28 and the ground surface 60 may generally be varied by actuating the lift actuator(s) 108.

Further, as shown in FIGS. 3 and 4, the tilt actuator 110 is pivotably coupled between the mount 104 and the central frame section 30 of the boom assembly 28. Similar to the lift actuator(s) 108, the tilt actuator(s) 110 may also be configured to have a selectively variable length. For example, in one embodiment, the tilt actuator(s) 110 may be configured as a fluid-driven actuator(s), such a hydraulic or pneumatic cylinder(s). However, in alternative embodiments, the tilt actuator(s) 110 may be configured as any other suitable type of actuator(s), such as electric linear actuator(s). Regardless, the tilt actuator(s) 110 may be configured to extend or retract to pivot or tilt the boom assembly 28 as a whole about a tilt axis 114 (FIG. 3) to adjust or change a corresponding tilt angle 116 of the boom assembly 28. The tilt axis 114 may be at least partially defined by the first pivot joint(s) 112A coupling the first end(s) 106A of the support arm(s) 106 to the mount 104. In some embodiments, the tilt axis 114 may be parallel to an axle of the agricultural sprayer 10 (e.g., an axle extending between rear wheels 16 perpendicular to the direction of travel 18) and parallel to the lateral direction 50. The tilt angle 116 of the boom assembly 28 may generally be defined between a central reference plane 30A extending between opposed top and bottom ends 30B, 30C of the central frame section 30 and a vertical reference plane 58A extending in the vertical direction 58.

Additionally, as shown in FIGS. 3 and 4, each spray nozzle 62 may be fixedly coupled to the boom assembly 28 (e.g., the central frame section 30) at a given orientation relative to the boom assembly 28. In one embodiment, the tilt actuator(s) 110 may be configured to extend or retract to pivot or tilt the boom assembly 28 to adjust or change a corresponding spray angle 64 of each spray nozzle 62. The spray angle 64 of the spray nozzle 62 may generally be defined between a spray axis 62A, the spray axis 62A extending in the general direction of the spray of fluid from the spray nozzle 62, and the ground surface 60.

As particularly shown in FIGS. 3 and 4, by extending/retracting the tilt actuator(s) 110, the tilt angle 116 of the boom assembly 28 may be adjusted such that the boom assembly 28 is actuated between a substantially vertical orientation (e.g., as shown in FIG. 4) and a substantially non-vertical orientation (e.g., as shown in FIG. 5). Specifically, as shown in FIG. 4, when in its substantially vertical orientation, the boom assembly 28 may define a substantially vertical operational tilt angle 116A that is equal or substantially equal to zero, such as a tilt angle 116A that is greater than or equal to zero degrees and less than 5 degrees, or greater than or equal to zero degrees and less than 2.5 degrees and/or any other subranges defined therebetween. Such a substantially vertical orientation is generally desirable for the boom assembly 28 when folding the boom sections inwardly to allow for the sprayer 10 to be operated within its transport mode. For instance, at the substantially vertical orientation, the various pivot axes 44A, 46A, 48A are oriented substantially parallel to the vertical direction 58, thereby allowing the boom sections to be folded inwardly relative to one another substantially horizontally (e.g., parallel to the lateral direction 50 of the boom assembly 28), thereby minimizing the vertical profile of the boom assembly 28 in the transport position. Additionally, when the boom assembly 28 is in its substantially vertical orientation, the spray nozzle 62 may be generally oriented perpendicularly to the ground surface 60, such as at a spray angle 64 that is substantially equal to 90 degrees.

In contrast, as shown in FIG. 5, when in its substantially non-vertical orientation, the boom assembly 28 may define a substantially non-vertical operational tilt angle 116B, such as a tilt angle 116B ranging from 5 degrees to about 90 degrees or from 5 degrees to about 75 degrees or from about 15 degrees to about 60 degrees or from about 30 degrees to about 60 degrees and/or any other subranges defined therebetween. As will be described below, such a substantially non-vertical orientation may allow the fold actuators of the boom assembly 28 to be used to individually adjust the vertical position of the various boom sections relative to the ground surface. For instance, at the substantially non-vertical orientation, the various pivot axes 44A, 46A, 48A are oriented relative to the vertical direction 58 at an angle generally corresponding to the non-vertical operational tilt angle 116B, thereby allowing the boom sections to be actuated via the fold actuators 52, 54, 56 in a direction having a vertical component of movement. Additionally, when the boom assembly 28 is in its non-vertical orientation, the spray nozzle 62 may be generally oriented non-perpendicularly relative to the ground surface 60, such as at a spray angle 64 that is substantially less than or greater than 90 degrees. As will be described below, adjustment of the spray angle 64 of the spray nozzle 62 via control of the tilt angle 116 of the boom assembly 28 may be used to improve spray coverage of the ground surface 60.

During operation of the agricultural sprayer 10, it is typically desirable for the various boom sections of the boom assembly 28 to be maintained at a given vertical distance from the ground surface 60 such that the boom assembly 28 is generally level relative to the ground surface 60 across the entire width of the boom assembly 28. In general, as the distance between the boom assembly 28 and ground surface 60 increases, the ground surface 60 that the spray nozzle 62 may cover with spray increases, as well as drift. Thus, the distance 72 may be chosen based on the desired coverage of the spray nozzle 62. In general, the boom assembly 28 may be raised or lowered by the lift actuator(s) 108 to adjust the vertical distance between the boom assembly 28 and the ground surface 60 to the desired distance. However, in some instances, as the boom assembly 28 traverses a field, the ground surface 60 may not be level such that one or more sections 32, 34, 36, 38, 40, 42 of the boom assembly 28 are closer or farther away from the ground surface 60 than desired. In such instances, control of the operation of the lift actuator 108, alone, will be insufficient to maintain the desired spacing between the various boom sections and the ground surface 60.

For instance, referring specifically to FIG. 6, an example is illustrated in which the ground surface 60 over which a portion of the boom assembly 28 extends is not level. For purposes of discussion, only the left side sections 34, 38, 42 of the boom assembly 28 are shown. However, it should be understood that the same or similar control actions as those described herein with reference to the left side sections 34, 38, 42 may also be taken for the right side sections 32, 36, 40 of the boom assembly 28.

As shown in FIG. 6, the ground surface 60 has a varying vertical profile or contour across the width of the left-side portion of the boom assembly 28. Specifically, in the illustrated embodiment, the vertical profile or contour varies across first, second, and third ground sections 60A, 60B, 60C of the ground surface 60, with the central boom section 30 and inner boom section 34 extending over the first ground section 60A, the middle boom section 38 extending over the second ground section 60B, and the outer wing section 42 extending over the third ground section 60C. As shown in FIG. 6, the first ground section 60A is generally flat, with the second and third ground sections 60B, 60C being angled upwardly relative first ground section 60A with progressively increasing slopes. In such an instance, without adjusting the orientation of the boom assembly 28 in the manner described herein, the vertical spacing or clearance between the boom assembly 28 and ground surface 60 would generally decrease as the boom assembly 28 extends outwardly from the central boom section 30 to the outer boom section 42.

However, in accordance with aspects of the present subject matter, the orientation or tilt angle 116 of the boom assembly 28 may be varied to allow relative vertical positioning of the individual boom sections to be adjusted to accommodate such a varying ground contour. Specifically, in several embodiments, during the performance of an agricultural spraying operation, the boom assembly 28 may be actuated or tilted to its substantially non-zero operational tilt angle 116B to allow the fold actuators 52, 54, 56 to be used to adjust the vertical positioning of the various boom sections. For example, in the illustrated embodiment, when the ground sections shown in FIG. 6 are encountered by the boom assembly 28, the middle boom section 38 may be pivoted slightly upwardly and laterally relative to the inner boom section 34 via operation of the middle fold actuator 54 to account for the upward slope of the second ground section 60B. Similarly, the outer boom section 42 may be pivoted upwardly and laterally relative to the middle boom section 38 via operation of the outer fold actuator 56 to account for the increased slope of the third ground section 60C. By controlling the operation of such fold actuators 54, 56 while the boom assembly 28 is oriented at its substantially non-zero operational tilt angle 116B, the various boom sections 30 34, 38, 42 may be maintained substantially equidistant from the ground surface 60 so that the boom assembly 28 is substantially level relative to the ground surface 60 across the entire width of the boom assembly 28. Additionally, it should be understood that, while not described above, the inner fold actuator 52 may also be actuated when necessary to adjust the vertical position of the inner boom section 34 relative to the ground surface 60. Additionally it should be appreciated that, depending on the contour of the ground surface 60, one or more of the boom sections 34, 38, 42 of the boom assembly 28 may instead be pivoted downwardly via operation of their respective fold actuators 52, 54, 56 to adjust the distance between the such boom section(s) and the ground surface 60.

Additionally, during operation of the agricultural sprayer 10, it may be desirable to control the spray angle 64 to improve the spray coverage of the spray nozzles 62. For example, the spray angle 64 may be adjustable to compensate for the ground speed of the agricultural sprayer 10, wind effects, and/or terrain type to reduce drift or overspray. In such instances, the tilt angle 116 of the boom assembly 28 may be varied to allow relative adjustments of the spray angle 64 to accommodate such control of the spray angle 64. Specifically, in several embodiments, during the performance of an agricultural spraying operation, the tilt actuator(s) 110 of the boom assembly 28 may be actuated to adjust the spray angle 64 of the spray nozzles 62.

Further, for folding of the boom assembly 28 into the transport position, it is desirable to reduce the lateral and vertical dimensions as much as possible to improve transport clearance. For example, it may be desirable to adjust the transport height (as shown by arrow 72A in FIG. 2) between the boom assembly 28 and the ground surface 60 when the boom assembly 28 is in its transport position. In such instance, the tilt actuator(s) 110 may be controllable to change the tilt angle 116 of the boom assembly 28 to increase or decrease the transport height 72A. For instance, in the embodiment shown in FIG. 2 in which the boom assembly 28 folds inwardly towards the central frame 12 of the sprayer 10 generally horizontally, the tilt actuator(s) 110 may be controlled configured to adjust the transport height 72A, such as by ensuring proper ground clearance, when the boom assembly is at its transport position. Alternatively, the boom assembly 28 may, instead, be configured to fold inwardly towards the central boom section 30 vertically. For instance, the boom assembly 28 may be configured such that the pivot axes defined between adjacent boom sections are normally oriented horizontally (as opposed to vertically) such that the boom sections fold upwardly or vertically into the transport position. In such instance, the tilt actuator(s) 110 may be controllable to reduce the transport height 72A of the agricultural sprayer 10 for transport, such as by tilting the folded boom assembly 28 downwardly from its vertical orientation to a more horizontal orientation. It should be appreciated that the tilt actuator(s) 110 may be controllable to change the tilt angle 116 of the boom assembly 28 not only after the boom assembly 28 has been folded into its transport position, but may also be controllable during actuation of the fold cylinders 52, 54, 56 between the transport and working positions. It should further be appreciated that the one or more sensor(s) 68 may be configured to measure the transport height 72A while the boom assembly 28 is in the transport position and the distance between the boom assembly 28 and the ground surface 60 while the boom assembly 28 is in the working position. Alternatively, the agricultural sprayer 10 may include one or more additional sensor(s) configured to measure the transport height 72A.

Figure 7:
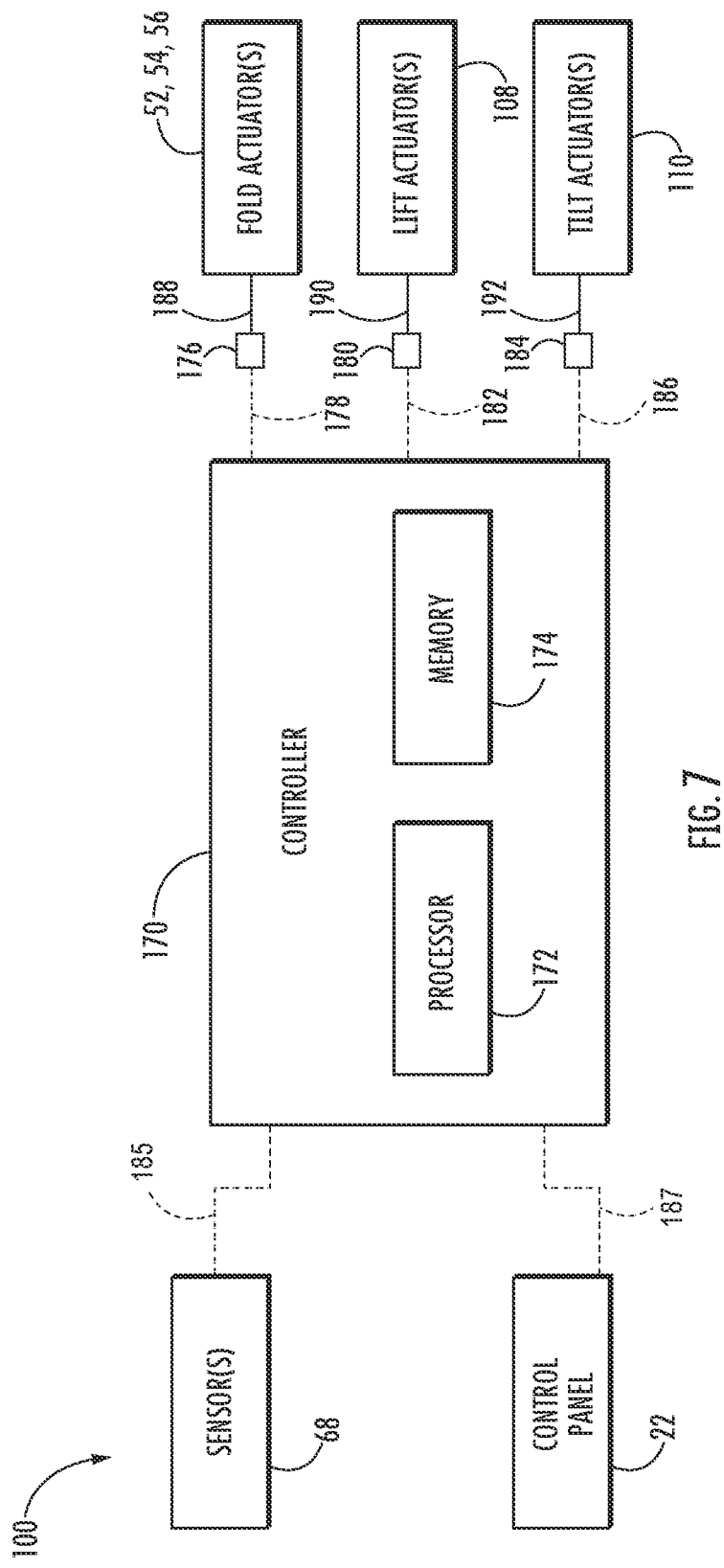
FIG. 7 illustrates a schematic view of one embodiment of a system for actuating a boom assembly of an agricultural sprayer in accordance with aspects of the present subject matter.

Referring now to FIG. 7, a schematic view of one embodiment of the system 100 described herein is illustrated in accordance with aspects of the present subject matter. As shown in FIG. 7, the system 100 includes many of the various machine components described above, such as the fold actuators 52, 54, 56, the lift actuator(s) 108, and the tilt actuator(s) 110. In addition, the system 100 further includes a controller 170 configured to electronically control the operation of one or more components of the agricultural sprayer 10. In general, the controller 170 may comprise any suitable processor-based device known in the art, such as a computing device or any suitable combination of computing devices. Thus, in several embodiments, the controller 170 may include one or more processor(s) 172 and associated memory device(s) 174 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 174 of the controller 170 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 174 may generally be configured to store suitable computer-readable instructions that, when implemented by the processor(s) 172, configure the controller 170 to perform various computer-implemented functions, such as one or more aspects of the method 200 described below with reference to FIG. 8. In addition, the controller 170 may also include various other suitable components, such as a communications circuit or module, one or more input/output channels, a data/control bus and/or the like.

It should be appreciated that the controller 170 may correspond to an existing controller of the agricultural sprayer 10 or the controller 170 may correspond to a separate processing device. For instance, in one embodiment, the controller 170 may form all or part of a separate plug-in module that may be installed in operative association with the agricultural sprayer 10 to allow for the disclosed system and method to be implemented without requiring additional software to be uploaded onto existing control devices of the agricultural sprayer 10.

In accordance with aspects of the present subject matter, the controller 170 may be configured to control one or more operational parameters of the agricultural sprayer 10 based on the orientation or position of the boom assembly 28 relative to the ground surface 60. Specifically, as shown in FIG. 7, the controller 170 may be communicatively coupled to suitable control valves 176 for regulating the supply of working fluid to each fold actuator 52, 54, 56 of the boom assembly 28 via a wired or wireless connection (e.g., as indicated by dashed line 178) and suitable control valves 180, 184 for regulating the supply of working fluid to each of the lift and tilt actuators 108, 110 of the linkage assembly 102 via respective wired or wireless connections (e.g., as indicated by respective dashed lines 182, 186) to allow control signals to be transmitted from the controller 170 to the control valves 176, 180, 184. In such instance, the control valves 176, 180, 184 may be fluidly connected to the actuators 52, 54, 56, 108, 110 through respective hydraulic lines (e.g., as indicated by lines 188, 190, 192). As such, the controller 170 may be configured to transmit control signals to the control valves 176, 180, 184 instructing the control valve(s) 176, 180, 184 to control the supply of working fluid to the respective actuator(s) 52, 54, 56, 108, 110 to adjust the position of one or one or more sections 30, 32, 34, 36, 38, 40, 42 of the boom assembly 28. For example, in several embodiments, the control signals may instruct the control valve(s) 176, 180, 184 to control the supply of working fluid to the actuators 52, 54, 56, 108, 110 to adjust the orientation or position of the boom assembly 28 relative to the ground surface 60 such that the boom assembly 28 remains level relative to the ground surface 60 (i.e., such that the various boom sections 30, 32, 34, 36, 38, 40, 42 of the boom assembly 28 are equally distant from the ground surface 60).

In some embodiments, the controller 170 may be configured to control the lift and tilt actuators 108, 110, e.g., upon initiation of the performance of an agricultural spraying operation, to properly orient/position the boom assembly 28 relative to the ground surface 60. For example, in one embodiment, the controller 170 may initially control the operation of the lift actuator(s) 108 to adjust the vertical distance 72 between the boom assembly 28 and the around surface 60 to within a desired vertical distance range (if needed). In addition, the controller 170 may control the operation of the tilt actuator(s) 110 to adjust the tilt angle 116 of the boom assembly 28 to a desired tilt angle. For instance, in one embodiment, the controller 170 may adjust the tilt angle 116 of the boom assembly 28 from the substantially zero operational tilt angle 116A (FIG. 4) to the substantially non-zero operational tilt angle 116B (FIG. 5), e.g., at the initiation of an agricultural spraying operation. In such an embodiment, as described above, the various pivot axes 44A, 46A, 48A of the boom assembly 28 may be tilted relative to the vertical direction 58, e.g., at the initiation of the agricultural spraying operation such that the fold actuators 52, 54, 56 may be subsequently used, as needed or as desired, to actuate the respective boom sections 32, 34, 36, 38, 40, 42 of the boom assembly 28 at least partially in the vertical direction 58 to level the boom assembly 28 relative to the ground surface 60 as the sprayer 10 is traversed across the ground surface 60. Additionally, in some embodiments, the controller 170 may adjust the tilt angle 116 of the boom assembly 28 to correspondingly adjust the spray angle 64 of the spray nozzles 62 to a desired angle to improve the spray coverage of the spray nozzles 62.

In one embodiment, the controller 170 may be configured to control the operation of the fold actuators 52, 54, 56 to adjust the vertical positioning of one or more of the boom sections while the boom assembly 28 is tilted relative to the vertical direction 58 based on inputs received from the operator of the agricultural sprayer 10. For example, the operator may monitor the relative orientation of the boom assembly 28 to the ground surface 60, such as by visually monitoring the vertical positioning of the various boom sections of the boom assembly 28 from the operator's cab 24 or by monitoring the measurements from one or more of the sensor(s) 68 via a display provided in the operator's cab 24. If the operator determines that the one or more sections 32, 34, 36, 38, 40, 42 of the boom assembly 28 are not properly positioned relative to the ground surface 30 (e.g., when it appears from a visual assessment or based on sensor data that one or more of the boom section are spaced from the ground surface 30 by a vertical distance that falls outside a predetermined vertical distance range), the operator may provide an input to the controller 170 (e.g., via the control panel 22 communicatively coupled to the controller 170 through a wired or wireless connection as indicated by dashed line 187) indicating that the vertical positioning of such boom section(s) needs to be adjusted. The controller 170 may then be configured to initiate control of the operation of the corresponding fold actuator(s) 52, 54, 56 to adjust the orientation or vertical position of the boom section(s) 32, 34, 36, 38, 40, 42 relative to the ground surface 60.

In addition to operator-initiated control (or as an alternative thereto), the controller 170 may be configured to automatically level the boom assembly 28 relative to the ground surface 60 based on one or more inputs received from the sensor(s) 68 of the agricultural sprayer 10. For example, the controller 170 may be in communication with one or more of the sensor(s) 68 described above such that the controller 170 is configured to receive measurements or sensor data provided by the sensor(s) 68. Specifically, as shown in FIG. 7, the controller 170 may be communicatively coupled to the sensor(s) 68 via a wired or wireless connection (e.g., indicated by dashed line 185) to allow data indicative of the profile or contour of the ground surface 60 to be transmitted from the sensor(s) 68 to the controller 170. In this regard, the controller 170 may be configured to process the sensor data received from the sensor(s) 68 to monitor the vertical positioning of one or more of the boom sections 32, 34, 36, 38, 40, 42 of the boom assembly 28 relative to the ground surface 60. For instance, based on the sensor data, the controller 170 may continuously or periodically determine or estimate the vertical position of each boom section relative to the ground surface as the agricultural sprayer 10 moves across a field. In such instance, if the controller 170 detects a change in the relative vertical positioning of one or more of the boom sections that results in such boom section(s) being positioned outside of a desired vertical position range for the boom assembly 28 (e.g., a predetermined height range), the controller 170 may automatically initiate control of the operation of the fold actuators 52, 54, 56 to adjust the vertical positioning of the out-of-range boom section(s) so as to maintain a desired levelness of the boom assembly 28 relative to the ground surface 60 across the width of the assembly 28 as the sprayer 10 encounters varying surface profiles.

As indicated above, in several embodiments, the sensor(s) 68 may be configured to detect a parameter indicative of the relative vertical positioning of the boom sections. For instance, in one embodiment, the sensor(s) 68 may be configured to detect the vertical height or distance 72 between each respective boom section and the ground surface 60. In such an embodiment, the controller 170 may be configured to continuously or periodically monitor the vertical height or distance 72 for each boom section and compare such monitored distance 72 to a desired vertical distance range set for the boom sections. If the monitored distance 72 for a given boom section falls within the desired vertical distance range, the controller 170 may determine that such boom section is appropriately positioned relative to the ground surface 60 and, thus, no adjustments to its relative vertical positioning are required. However, if the monitored distance 72 for a given boom section falls outside the desired vertical distance range, it may be determined that the relative vertical positioning of such boom section(s) requires adjustments. In such instance, the controller 170 may, for example, control the operation of the corresponding fold actuator 52, 54, 56 to adjust the vertical positioning of the boom section(s) until the monitored distance 72 is once again with the desired vertical distance range.

It should be appreciated that, in some embodiments, the controller 170 may be configured to control the lift actuator(s) 108 upon a determination that adjustment of the relative vertical positioning of the boom sections 32, 34, 36, 38, 40, 42 via actuation of the fold actuators 52, 54, 56 is insufficient to properly level the boom assembly 28. Specifically, in one embodiment, the controller 170 may be configured to raise or lower the boom assembly 28 to adjust the overall height of the boom assembly 28 relative to the ground surface 60 when it is determined that the measured distance 72 for one or more of the boom sections 32, 34, 36, 38, 40, 42 falls outside the desired vertical distance range by a value equal to or greater than a predetermined threshold amount. For instance, depending on the tilt angle 116 of the boom assembly 28, each fold actuator 52, 54, 56 may only be able to adjust the vertical positioning of its respective boom section 32, 34, 36, 38, 40, 42 a given distance to account for a change in orientation between the boom section 32, 34, 36, 38, 40, 42 and the ground surface 60. In such instance, the threshold amount may be selected based on the capability of each fold actuator 52, 54, 56 to adjust the vertical positioning of its respective boom section 32, 34, 36, 38, 40, 42, with the threshold amount generally increasing with increased in the tilt angle 116 of the boom assembly 28. For instance, a look-up table may be stored within the controller 170 that sets the threshold amount for each fold actuator 52, 54, 56 as a function of the current tilt angle 116 of the boom assembly 28.

Additionally, in another embodiment, the controller 170 may be configured to control the tilt actuators (110) to adjust the vertical height of the boom assembly 28. For example, in one embodiment, the controller 170 may control the operation of the fold actuators 52, 54, 56 to fold the various boom sections into the transport position. The controller 170 may additionally control the tilt actuator(s) 110 to change the tilt angle 116 of the boom assembly 28 to increase or decrease the transport height 72A. For instance, in the embodiment shown in FIG. 2 in which the boom assembly 28 folds inwardly towards the central frame 12 of the sprayer 10 generally horizontally, the controller 170 may control the tilt actuator(s) 110 to increase the transport height 72A, to ensure proper ground clearance. Alternatively, in an embodiment where the boom assembly 28 is configured to such that the various boom sections fold upwardly or vertically into the transport position, the controller 170 may control the tilt actuator(s) 110 to reduce the vertical height of the agricultural sprayer 10 once the boom assembly 28 is in the transport position, such as by tilting the folded boom assembly 28 downwardly from its vertical orientation to a more horizontal orientation. However, it should be appreciated that the controller 170 may instead control the tilt actuator(s) 110 during the performance of the folding operation in which the boom assembly 28 is being moved from its working position to its transport position (or vice versa) to adjust the vertical height of the agricultural sprayer 10.

Figure 8:
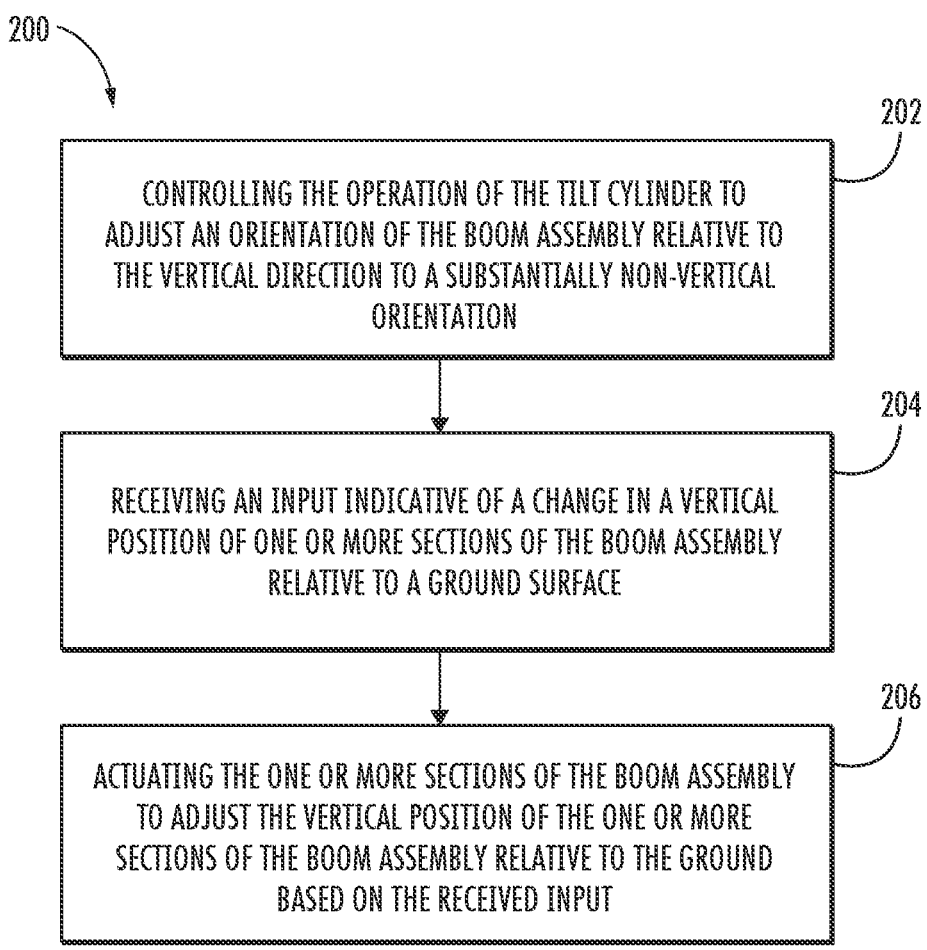
FIG. 8 illustrates a flow diagram of one embodiment of a method for actuating a boom assembly of an agricultural sprayer in accordance with aspects of the present subject matter.

Referring now to FIG. 8, a flow diagram of one embodiment of a method 200 for actuating a boom assembly of an agricultural sprayer is illustrated in accordance with aspects of the present subject matter. In general, the method 200 will be described herein with reference to the agricultural sprayer 10 and system 100 described above with reference to FIGS. 1-7. However, it should be appreciated by those of ordinary skill in the art that the disclosed method 200 may generally be implemented with any agricultural spraying machine/assembly having any suitable machine/assembly configuration and/or any system having any suitable system configuration. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 8, at (202), the method 200 may include controlling, with a computing device, the operation of the tilt actuator to adjust an orientation of the boom assembly relative to the vertical direction to a substantially non-vertical orientation. For instance, as described above, the tilt angle 116 of the boom assembly 28 may be adjusted to the operational tilt angle 116B by controlling the operation of the tilt actuator(s) 110.

Additionally, at (204), the method 200 may include receiving, with the computing device, an input indicative of a change in a vertical position of one or more sections of the boom assembly relative to a ground surface. For instance, as indicated above, an input or signal may either be an input generated by an operator's interaction with a user interface (e.g., control panel 22) indicating that one or more of the boom sections 32, 34, 36, 38, 40, 42 of the boom assembly 28 is not at the desired vertical distance from the ground surface 60 or an input from the sensor(s) 68 corresponding to a change in the vertical distance of one or more boom sections 32, 34, 36, 38, 40, 42 of the boom assembly 28 relative to the ground surface 60.

Moreover, at (206), the method may include actuating, with the computing device, the one or more sections of the boom assembly to adjust the vertical position of the one or more sections of the boom assembly relative to the ground based on the received input. Specifically, as indicated above, one or more of the fold actuators 52, 54, 56 may be actuated to adjust the orientation between a respective boom section 32, 34, 36, 38, 40, 42 of the boom assembly 28 and the ground surface 28 to move the respective boom section 32, 34, 36, 38, 40, 42 to the desired vertical distance from the ground surface 28 based on the input received from the operator or sensor(s) 68.

Figure 9:
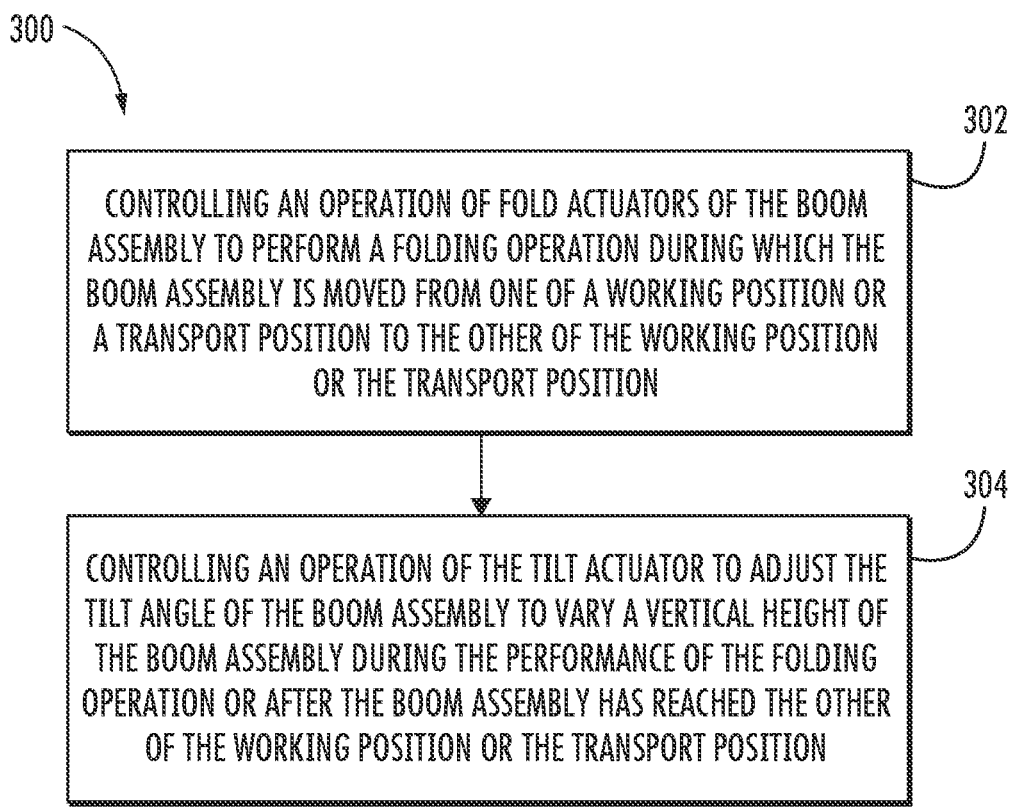
FIG. 9 illustrates a flow diagram of another embodiment of a method for actuating a boom assembly of an agricultural sprayer in accordance with aspects of the present subject matter.

Referring now to FIG. 9, a flow diagram of another embodiment of a method 300 for actuating a boom assembly of an agricultural sprayer is illustrated in accordance with aspects of the present subject matter. In general, the method 300 will be described herein with reference to the agricultural sprayer 10 and system 100 described above with reference to FIGS. 1-7. However, it should be appreciated by those of ordinary skill in the art that the disclosed method 300 may generally be implemented with any agricultural spraying machine/assembly having any suitable machine/assembly configuration and/or any system having any suitable system configuration. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 9, at (302), the method 300 may include controlling, with a computing device, an operation of fold actuators of the boom assembly to perform a folding operation during which the boom assembly is moved from one of a working position or a transport position to the other of the working position or the transport position. For instance, as described above, the fold actuators 52, 54, 56 may be actuated to fold the boom sections 32, 34, 36, 38, 40, 42 from the working position inwardly towards the central boom section 30 into the transport position. The boom sections 32, 34, 36, 38, 40, 42 may pivot about pivot axes 44A, 46A, 48A that may be substantially horizontal or vertical when the boom assembly 28 is at the vertical operational tilt angle 116A.

Moreover, at (304), the method may include controlling, with the computing device, an operation of the tilt actuator to adjust the tilt angle of the boom assembly to vary a vertical height of the boom assembly 28 during the performance of the folding operation or after the boom assembly has reached the other of the working position or the transport position. For instance, as described above, while the boom assembly 28 is in or being moved into the transport position, the tilt angle 116 of the boom assembly 28 may be adjusted by controlling the operation of the tilt actuator(s) 110 to vary the vertical transport height 72A of the boom assembly 28.

It is to be understood that the steps of the methods 200, 300 are performed by the controller 170 upon loading and executing software code or instructions which are tangibly stored on a tangible computer readable medium, such as on a magnetic medium, e.g., a computer hard drive, an optical medium, e.g., an optical disc, solid-stale memory, e.g., flash memory, or other storage media, known in the art. Thus, any of the functionality performed by the controller 170 described herein, such as the methods 200, 300, is implemented in software code or instructions which are tangibly stored on a tangible computer readable medium. The controller 170 loads the software code or instructions via a direct interface with the computer readable medium or via a wired and/or wireless network. Upon loading and executing such software code or instructions by the controller 170, the controller 170 may perform any of the functionality of the controller 170 described herein, including any steps of the methods 200, 300 described herein.

The term "software code" or "code" used herein refers to any instructions or set of instructions that influence the operation of a computer or controller. They may exist in a computer-executable form, such as machine code, which is the set of instructions and data directly executed by a computes central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for actuating a boom assembly of an agricultural sprayer, the boom assembly being coupled to a frame of the agricultural sprayer via a linkage assembly comprising a tilt actuator configured to adjust a tilt angle of the boom assembly relative to a vertical direction, the method comprising:

controlling, with a computing device, an operation of the tilt actuator to adjust an orientation of the boom assembly relative to the vertical direction to a substantially non-vertical orientation;

receiving, with the computing device, an input indicative of a change in a vertical position of one or more sections of the boom assembly relative to a field reference position; and actuating, with the computing device, the one or more sections of the boom assembly to adjust the vertical position of the one or more sections of the boom assembly relative to the field reference position based on the input.

2. The method of claim 1, wherein controlling the operation of the tilt actuator to adjust the orientation of the boom assembly comprises adjusting the tilt angle of the boom assembly to an operational tilt angle, the operational tilt angle corresponding to a substantially non-zero tilt angle relative to the vertical direction.

3. The method of claim 1, wherein the boom assembly comprises a first boom section, a second boom section, and a fold actuator coupled between the first and second boom sections, the fold actuator being configured to actuate the second boom section relative to the first boom section about a pivot axis, wherein receiving the input comprises receiving an input indicative of a change in the vertical position of the second boom section relative to the field reference position.

4. The method of claim 3, wherein actuating the one or more sections of the boom assembly comprises controlling the operation of the fold actuator to actuate the second boom section relative to the first boom section about the pivot axis to account for the change in the vertical position of the second boom section relative to the field reference position.

5. The method of claim 4, wherein controlling the operation of the tilt actuator comprises controlling the operation of the tilt actuator to adjust the tilt angle of the boom assembly in a manner that tilts the pivot axis relative to the vertical direction such that the second boom section is actuated at least partially in the vertical direction via operation of the fold actuator.

6. The method of claim 1, wherein receiving the input comprises receiving an input from an operator of the agricultural sprayer.

7. The method of claim 1, wherein receiving the input comprises receiving sensor data from at least one sensor configured to detect a parameter indicative of the vertical position of the one or more sections relative to the field reference position.

8. The method of claim 7, wherein the parameter comprises a vertical distance defined between the one or more sections and the field reference position, the method further comprising comparing, with the computing device, the vertical distance to a desired vertical distance range defined for the one or more sections.

9. The method of claim 8, wherein actuating the one or more sections of the boom assembly comprises actuating the one or more sections via a fold actuator associated with the one or more sections to adjust the vertical position of the one or more sections relative to the field reference position when the vertical distance falls outside of the desired vertical distance range.

10. A method for actuating a boom assembly of an agricultural sprayer, the boom assembly being coupled to a frame of the agricultural sprayer via a linkage assembly comprising a tilt actuator configured to adjust a tilt angle of the boom assembly relative to a vertical direction, the method comprising:

controlling, with a computing device, an operation of fold actuators of the boom assembly to perform a folding operation during which the boom assembly is moved from one of a working position or a transport position to the other of the working position or the transport position; and controlling, with the computing device, an operation of the tilt actuator to adjust the tilt angle of the boom assembly after the boom assembly has reached the other of the working position or the transport position.

11. The method of claim 10, wherein controlling the operation of the tilt actuator after the boom assembly has reached the working position comprises controlling the operation of the tilt actuator to adjust an orientation of the boom assembly relative to the vertical direction to a substantially non-vertical orientation.

12. The method of claim 10, wherein controlling the operation of the tilt actuator to adjust the tilt angle of the boom assembly after the boom assembly has reached the transport position comprises controlling the operation of the tilt actuator to adjust a transport height defined between the boom assembly and a field surface.

13. The method of claim 10, further comprising receiving an input from an operator of the agricultural sprayer indicative of a request to adjust the tilt angle of the boom assembly, wherein controlling the operation of the tilt actuator comprises controlling the operation of the tilt actuator in response to receiving the input from the operator.

14. The method of claim 10, further comprising receiving sensor data from at least one sensor configured to detect a parameter indicative of a vertical position of the boom assembly relative to a field reference position, wherein controlling the operation of the tilt actuator comprises controlling the operation of the tilt actuator when the vertical position of the boom assembly relative to the field reference position is outside of a desired vertical distance range defined for the boom assembly.

15. The method of claim 10, wherein controlling the operation of the fold actuators comprises controlling the operation of the fold actuators to perform the folding operation during which the boom assembly is moved from the one of the working position or the transport position to the other of the working position or the transport position, boom sections of the boom assembly being unfolded along a lateral direction when the boom assembly is in the working position, the boom sections being folded along the lateral direction when the boom assembly is in the transport position.

* * * * *